US012319053B2

(12) United States Patent
Suzuki

(10) Patent No.: US 12,319,053 B2
(45) Date of Patent: Jun. 3, 2025

(54) PRINTER AND PAPER DRAWING-OUT METHOD

(71) Applicant: TOSHIBA TEC KABUSHIKI KAISHA, Tokyo (JP)

(72) Inventor: Akira Suzuki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 270 days.

(21) Appl. No.: 18/190,201

(22) Filed: Mar. 27, 2023

(65) Prior Publication Data

US 2024/0326483 A1 Oct. 3, 2024

(51) Int. Cl.
*B41J 15/04* (2006.01)

(52) U.S. Cl.
CPC .................................. *B41J 15/042* (2013.01)

(58) Field of Classification Search
CPC ........................................................ B41J 14/52
See application file for complete search history.

(56) References Cited

U.S. PATENT DOCUMENTS

2018/0272765 A1* 9/2018 Iwamoto .................. B41J 11/70
2021/0300090 A1* 9/2021 Yamaguchi ............ B65H 16/08
2022/0203714 A1* 6/2022 Sato ......................... B41J 11/42

FOREIGN PATENT DOCUMENTS

JP 2013-35183 2/2013

* cited by examiner

*Primary Examiner* — Justin Seo
*Assistant Examiner* — Tracey M McMillion
(74) *Attorney, Agent, or Firm* — Amin, Turocy & Watson, LLP

(57) ABSTRACT

A printer includes a storing unit configured to store liner-less roll paper formed by winding, in a roll shape, continuous paper including an adhesive surface on a rear surface of a printing surface. The printer includes a conveying unit configured to draw out one end of the continuous paper in the roll paper from the roll paper in an unwinding manner and convey a sheet portion that is the drawn-out continuous paper in a sheet form. The printer includes a vibrating unit configured to apply vibration to a contact point of the sheet portion and an external circumferential surface of the roll paper, the external circumferential surface adhering to the adhesive surface of the sheet portion.

14 Claims, 3 Drawing Sheets

PRINTER AND PAPER DRAWING-OUT METHOD

FIELD

Embodiments described herein relate generally to a technique for drawing out paper from roll paper in a printer.

BACKGROUND

There has been known a liner-less printer as a printing apparatus such as a POS (Point Of Sales) printer. In the liner-less printer, roll paper of a liner-less type is used as a printing target storage medium. The roll paper is formed by winding long continuous paper (printing paper) in multiple layers in a cylindrical shape. Specifically, the rear surface of a printing surface of the liner-less roll paper is a paste surface. If the continuous paper is wound, layers of the liner-less roll paper adjacent to each other in the radial direction thereof are bonded to each other and a roll shape of the liner-less roll paper is maintained.

As the liner-less printer, there are a printer including a guide mechanism for rotatably axially supporting the left and the right of the liner-less roll paper and a printer not including the guide mechanism. In the printer not including the guide mechanism, the roll paper is put and stored in a hopper of the printer. Therefore, the roll paper is freely movable in the hopper. If printing is performed on the continuous paper by the printer, one end of the roll paper is drawn out and the continuous paper is conveyed to a thermal head. After printing is performed on the continuous paper conveyed to the thermal head, the continuous paper is cut into a predetermined shape by a cutter and used by, for example, being pasted to a surface to be pasted.

DETAILED DESCRIPTION

Figure 1:
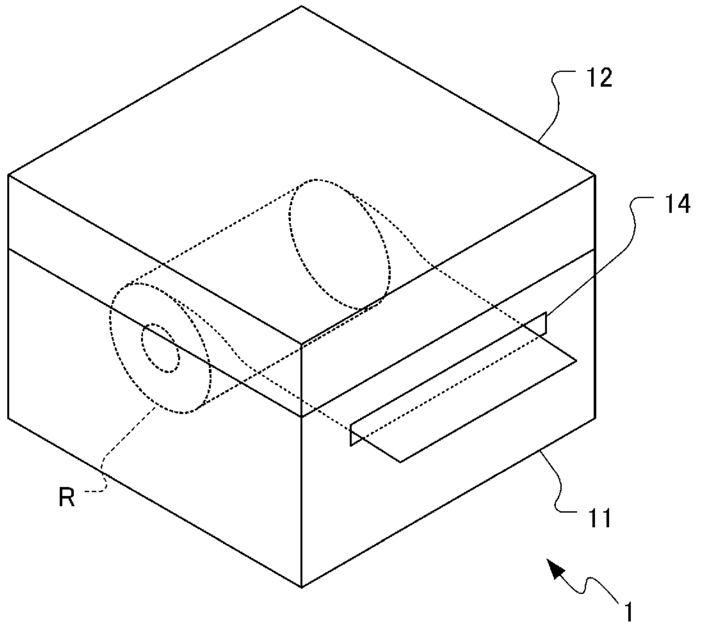
FIG. 1 is a schematic perspective view illustrating a configuration of a printer according to a first embodiment.

An aspect of embodiments is to provide a technique that makes it possible to stably draw out continuous paper from roll paper.

A printer according to an embodiment includes: a storing unit configured to store liner-less roll paper formed by winding, in a roll shape, continuous paper including an adhesive surface on a rear surface of a printing surface; a conveying unit configured to draw out one end of the continuous paper in the roll paper from the roll paper in an unwinding manner and convey a sheet portion that is the drawn-out continuous paper in a sheet form; and a vibrating unit configured to apply vibration to a contact point of the sheet portion and an external circumferential surface of the roll paper, the external circumferential surface adhering to the adhesive surface of the sheet portion.

Embodiments are explained below with reference to the drawings. In the figures, the same components are denoted by the same reference numerals and signs.

First Embodiment

Figure 2:
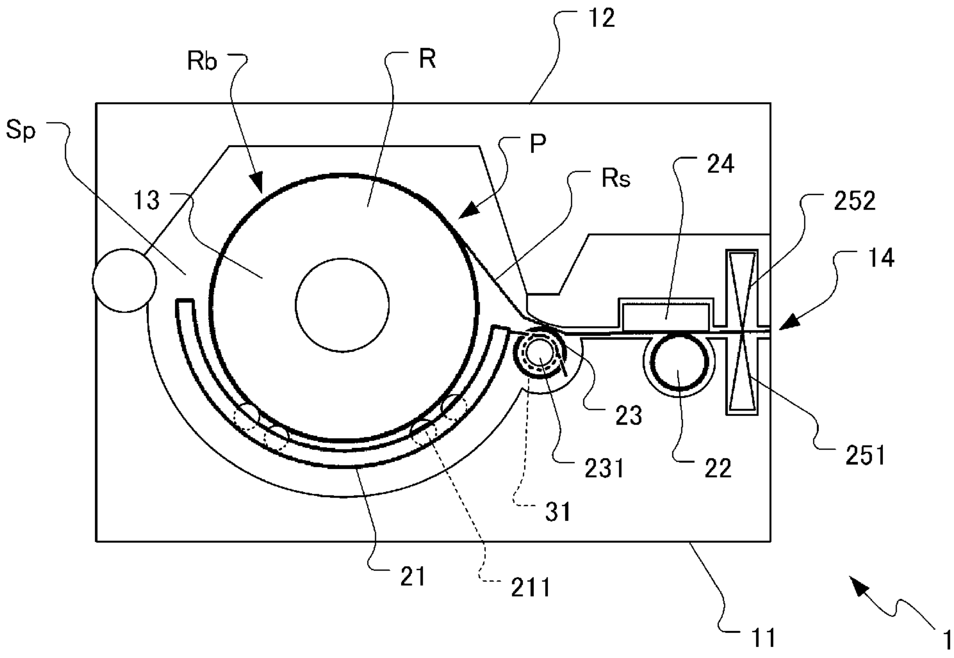
FIG. 2 is a schematic longitudinal sectional view schematically illustrating an internal configuration of the printer.

A configuration of a printer according to a first embodiment is explained. FIG. 1 is a schematic perspective view illustrating a configuration of the printer according to this embodiment. FIG. 2 is a schematic longitudinal sectional view schematically illustrating an internal configuration of the printer according to this embodiment. In FIG. 2, an internal configuration of a printer 1 viewed from a side is illustrated.

As illustrated in FIGS. 1 and 2, the printer 1 according to this embodiment is an apparatus that prints characters, numbers, figures, and the like on roll paper R that is a storage medium. The printer 1 includes a housing 11 and a cover 12 attached to the housing 11 to be capable of opening and closing with a hinge section 13 as an axis. In FIGS. 1 and 2, a state in which the cover 12 is closed is illustrated. In the state in which the cover 12 is closed, a storage space Sp capable of storing the roll paper R on the inside is defined in the housing 11.

The printer 1 is configured to make it possible to easily set the roll paper R in the storage space Sp from the outside. Specifically, a user can set the roll paper R in the printer 1 only by opening the cover 12, putting the roll paper R in a swinging hopper 21 explained in detail below that defines the storage space Sp, and closing the cover 12. That is, the roll paper R is set without being rotatably axially supported in the storage space Sp.

The roll paper R is roll paper of a liner-less type that maintains a cylindrical shape formed by winding, in multiple layers, long continuous paper, the front surface of which is a printing surface (a print surface) and the rear surface 3 of which is a paste surface, to bond paste surfaces of layers adjacent to each other in the radial direction of the continuous paper. Examples of such continuous paper include label paper formed by a continuous plurality of labels.

A discharge port 14 is formed in the front of the printer 1. By discharging printed continuous paper explained below from the discharge port 14 and cutting the continuous paper into a predetermined length by cutters 251 and 252 explained below, the printer 1 can produce continuous paper having a predetermined shape in a state in which the continuous paper can be pasted to a surface to be pasted.

(Internal Configuration of the Printer 1)

As illustrated in FIG. 2, a swinging hopper 21, a platen roller 22, a peeling roller 23, a thermal head 24, the cutters 251 and 252, and swinging members 31 are provided in the housing 11 of the printer 1.

The swinging hopper 21 is swingably provided in the storage space Sp. The swinging hopper 21 is a plate-like member that is formed in an arcuate shape to be recessed in an upper surface and extends in a conveying direction and extends to be capable of storing the roll paper R in a left-right direction (a width direction) orthogonal to a conveying direction and an up-down direction. The upper surface of the swinging hopper 21 is formed as a placing surface capable of coming into contact with the outer circumferential surface of the roll paper R. The lower surface of the swinging hopper 21 can come into contact with an arcuate bottom wall defining the storage space Sp while conforming to the shape of the bottom wall. The swinging hopper 21 includes a plurality of (in this embodiment, four) supporting rollers 211 capable of rotating relatively to one another. The swinging hopper 21 supports and stores, via the supporting rollers 211, the roll paper R put in the storage space Sp.

Specifically, the plurality of supporting rollers 211 are provided to be separated from one another in an arc direction of the swinging hopper 21. In this embodiment, two supporting rollers 211 are paired. The pair of supporting rollers 211 is disposed to be separated in the conveying direction of the continuous paper (the right direction in FIG. 2). The supporting roller 211 is a free roller that is provided in the swinging hopper 21 with a rotating shaft of the free roller extending in the left-right direction. Parts of the outer circumferential surfaces of the supporting rollers 211 project from the placing surface of the swinging hopper 21. The plurality of supporting rollers 211 come into contact with the outer circumferential surface of the roll paper R and hold the roll paper R in cooperation with one another. Consequently, the plurality of supporting rollers 211 can restrict movement in the conveying direction of the roll paper R to a certain degree. The supporting rollers 211 can rotate according to rotation of the roll paper R and enables stable rotation of the roll paper R.

The platen roller 22 is provided to be located on the downstream side of the swinging hopper 21 in the conveying direction. A driving force from a not-illustrated driving motor provided in the housing 11 is transmitted to the platen roller 22, whereby the platen roller 22 rotates around a not-illustrated rotating shaft (rotates clockwise in FIG. 2). The platen roller 22 draws out one end of the roll paper R, that is, the end portion of the continuous paper located in the outermost circumference of the roll paper R and conveys the roll paper R toward the thermal head 24 and the cutters 251 and 252.

The peeling roller 23 is a free roller that is provided to be located between the swinging hopper 21 and the platen roller 22 and capable of rotating around a rotating shaft 231 extending in the left-right direction. The peeling roller 23 guides a drawn-out sheet portion Rs from the storage space Sp to the platen roller 22. Further, if the sheet portion Rs is drawn out from the roll paper R by the platen roller 22, the peeling roller 23 plays a role of peeling the sheet portion Rs from a roll main body Rb of the roll paper R.

The thermal head 24 includes an arrayed plurality of heat generating bodies and is provided to be located above the platen roller 22. The thermal head 24 adheres to the platen roller 22 to be capable of holding the sheet portion Rs between the thermal head 24 and the platen roller 22. The thermal head 24 causes the heat generating bodies to generate heat according to a preset printing pattern too thereby perform printing on a printing surface of the sheet portion Rs held between the thermal head 24 and the platen roller 22.

The cutters 251 and 252 are provided to be located on the downstream side in the conveying direction of the platen roller 22. The cutters 251 and 252 are vertically separated such that blades of the cutters 251 and 252 are slightly separated from and opposed to each other. If the sheet portion Rs conveyed by the platen roller 22 is discharged from the discharge port 14 to a predetermined length, the cutters 251 and 252 come into contact with each other to cut the sheet portion Rs.

The swinging members 31 are wound on the rotating shaft 231 of the peeling roller 23 to be formed as torsion springs attached to be incapable of relatively rotating. One end portions extending in a tangential direction from winding portions of the swinging members 31 are coupled to a conveying direction downstream side end portion of the swinging hopper 21. It is preferable that the swinging members 31 are respectively provided at the axial direction both end portions of the rotating shaft 231 to be paired and each of the two swinging members 31 is coupled to the downstream side end portion of the swinging hopper 21.

The swinging members 31 urge the swinging hopper 21 to swing in a rotating direction of the peeling roller 23 with the rotating shaft 231 as a fulcrum. The swinging members 31 enable the swinging hopper 21 to swing with the rotating shaft 231 as a fulcrum. The swinging is facilitated by an urging force of the swinging members 31. It is preferable that, in a state in which the roll paper R is stored in the swinging hopper 21, the swinging members 31 support the swinging hopper 21 while lifting the swinging hopper 21 to a degree in which the lower surface of the swinging hopper 21 does not come into contact with the bottom wall of the storage space Sp. In other words, it is preferable to design the swinging members 31 to apply, to the swinging hopper 21, an urging force resisting the load of the roll paper R and the swinging hopper 21.

(Operation and Effects of the Printer 1)

Figure 3:
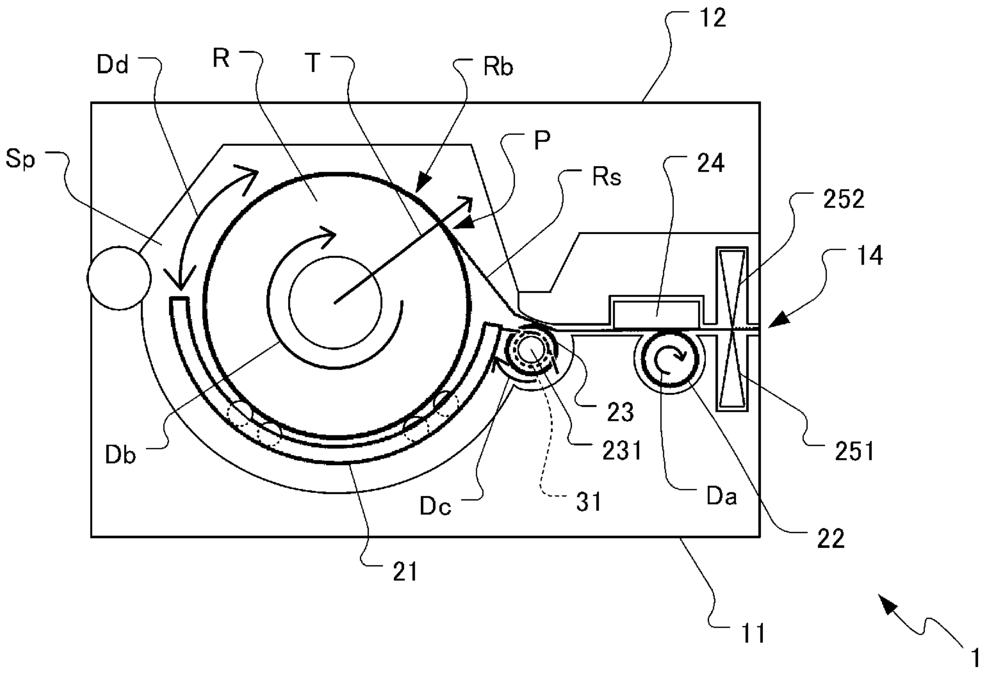
FIG. 3 is a diagram for explaining an operation of the printer.

An operation and effects of the printer 1 according to this embodiment are explained. FIG. 3 is a diagram for explaining the operation of the printer according to this embodiment. In FIG. 3, an internal configuration of the printer 1 viewed from a side is illustrated, the printer 1 being in a state in which the cover 12 is closed.

First, print driving for the printer 1 is performed in a state in which the roll paper R is placed on the swinging hopper 21 and the sheet portion Rs is drawn out from the roll paper R to the platen roller 22 via the peeling roller 23. If the print driving is performed, as illustrated in FIG. 3, the platen roller 22 is rotated in a rotating direction Da by a driving motor. According to the rotation, the sheet portion Rs is drawn out from the roll paper R and the roll paper R rotates in a rotating direction Db.

If the sheet portion Rs is drawn out from the roll paper R, the peeling roller 23 is rotated in a rotating direction Dc according to conveyance of the sheet portion Rs to be drawn out. According to the rotation of the peeling roller 23, the sheet portion Rs is peeled from the roll main body Rb of the roll paper R. Specifically, at a contact point P (a so-called drawing-out point) of the outer circumferential surface of the roll main body Rb and the sheet portion Rs to be drawn out, the sheet portion Rs is peeled from the outer circumferential surface of the roll main body Rb resisting an adhesive force in an adhesive material of a paste surface of the sheet portion Rs.

In the thermal head 24, printing is performed on a printing surface of the sheet portion Rs drawn out by the platen roller 22. After the printing, the printed sheet portion Rs is conveyed toward the discharge port 14 by the platen roller 22 again. If the sheet portion Rs is discharged from the discharge port 14 by a predetermined amount (an amount of the printed printing surface discharged from the discharge port 14), the sheet portion Rs is cut by the cutters 251 and 252. After the cutting, the sheet portion Rs having a predetermined shape including the printed printing surface is obtained.

In this embodiment, if the sheet portion Rs is peeled, force for attracting the roll paper R to the sheet portion Rs side, that is, the contact point P side is applied to the roll paper R by the adhesive force of the sheet portion Rs. With the force, the swinging hopper 21 urged from the swinging members 31 can swing in a rotating direction Dd together with the roll main body Rb, specifically, swing with the rotating shaft 231 as a fulcrum. If the swing of the swinging hopper 21 occurs, swing (vibration) is applied to the contact point P in the same manner. In particular, vibration in a tangential direction T toward the contact point P from the center of the roll paper R can be applied to the contact point P as vibration.

The vibration is applied to the contact point P in this way, whereby the peeling of the sheet portion Rs from the roll main body Rb is supported. That is, a peeling force for the sheet portion Rs at the contact point P is relaxed. It is possible to more easily peel the sheet portion Rs from the roll main body Rb. Since the sheet portion Rs is easily peeled, it is possible to prevent excessive movement of the roll paper R due to the adhesive force of the adhesive material in the sheet portion Rs.

According to this embodiment explained above, it is possible to apply vibration to the contact point P. Therefore, it is possible to reduce and relax the peeling force for peeling the sheet portion Rs from the roll main body Rb and easily perform the peeling. As a result, it is possible to enable the sheet portion Rs to be stably drawn out. Since the sheet portion Rs is stably drawn out, it is possible to prevent hindrance of stable conveyance of the continuous paper to the thermal head 24 due to excessive movement of the roll paper R. Therefore, it is possible to prevent deficiencies such as compressed printing (character crowding) and white line (print omission). It is also possible to prevent collision of a wall surface in the storage space Sp for the roll paper R.

In particular, in an initial driving state in which movement of the roll paper R is conspicuous and the platen roller 22 is driven to rotate to draw out the sheet portion Rs in a state in which the roll paper R is standing still, according to this embodiment, it is also possible to stably draw out the sheet portion Rs.

Sudden fluctuation in conveying speed of the platen roller 22 can occur and slack, stiffness, and the like of the sheet portion Rs can occur because, for example, printing speed of the thermal head 24 is changed according to printing duty. However, according to this embodiment, even if such sudden fluctuation in the conveying speed and the slack and the stiffness of the sheet portion Rs occur, the swinging hopper 21 can relax these problems by swinging of the swinging hopper 21. That is, it is possible to cause the swinging hopper 21 to function as a damper.

Note that, in this embodiment, the swinging members 31 are explained as being attached to the rotating shaft 231 but are not limited to this. Even if the swinging members 31 are provided in another position such as the inside of the storage space Sp, the swinging members 31 can apply a certain degree of vibration to the contact point P if the swinging members 31 are capable of swinging the swinging hopper 21.

Second Embodiment

Figure 4:
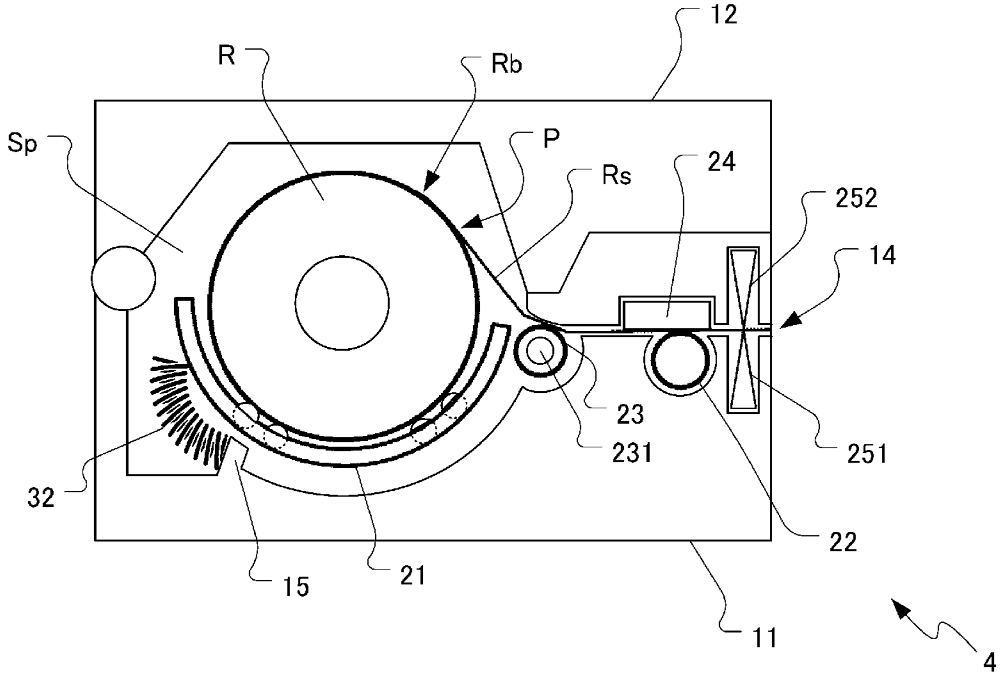
FIG. 4 is a diagram for explaining a configuration of a printer according to a second embodiment.

FIG. 4 is a diagram for explaining a configuration and an operation of a printer according to a second embodiment. In FIG. 4, as in FIG. 3, an internal structure of a printer 4 viewed from a side is illustrated, the printer 4 being in a state in which the cover 12 is closed.

The printer 4 according to this embodiment is different from the printer 1 according to the first embodiment in that the printer 4 includes swinging members 32 instead of the swinging members 31.

The swinging members 32 are formed as compression springs locked by a locking section 15, one end of which is coupled to a conveying direction upstream side end portion of the swinging hopper 21 and the other end of which is integrally formed on the bottom wall of the storage space Sp. The swinging members 32 support the upstream side end portion of the swinging hopper 21, whereby the swinging members 32 are compressed to a certain degree in a state in which the roll paper R is placed on the swinging hopper 21. According to this compression, like the swinging members 31, the swinging members 32 are capable of urging and swinging the swinging hopper 21. It is preferable to, considering compactness of the printer 4, form the swinging members 32 to be curved in an arcuate shape to be fit in an extra space in the storage space Sp.

The swinging hopper 21 supported by the swinging members 32 is preferably coupled to the rotating shaft 231 to be capable of relatively rotating at the conveying direction downstream side end portion. The swinging hopper 21 can swing with the rotating shaft 231 as a fulcrum by being coupled to the rotating shaft 231. Therefore, the printer 4 can obtain the same effects as the effects of the printer 1 according to the first embodiment.

The printer 4 may adopt a form in which the swinging hopper 21 is not coupled to the rotating shaft 231 and is supported by only the swinging members 32. In this case, coupling positions of the swinging members 32 and the swinging hopper 21 may be any positions. The printer 4 may adopt a form in which the conveying direction upstream side end portion of the swinging hopper 21 is coupled to the swinging members 32 and the conveying direction downstream side end portion is slidably set in contact with and supported by the bottom wall in the storage space Sp. In this case, the coupling positions of the swinging members 32 and contact positions with the bottom wall may be changed to each other. Even in these two forms, although the swinging members 32 do not swing with the rotating shaft 231 as a fulcrum, the swinging members 32 can swing the swinging hopper 21 and can apply a certain degree of vibration to the contact point P.

The operation of the printer 4 according to this embodiment is substantially the same as the operation of the printer 1 according to the first embodiment. Therefore, detailed explanation is omitted here.

One swinging member 32 may be provided substantially in the center in the width direction of the swinging hopper 21 or a plurality of swinging members 32 may be provided in parallel in the width direction.

Third Embodiment

Figure 5:
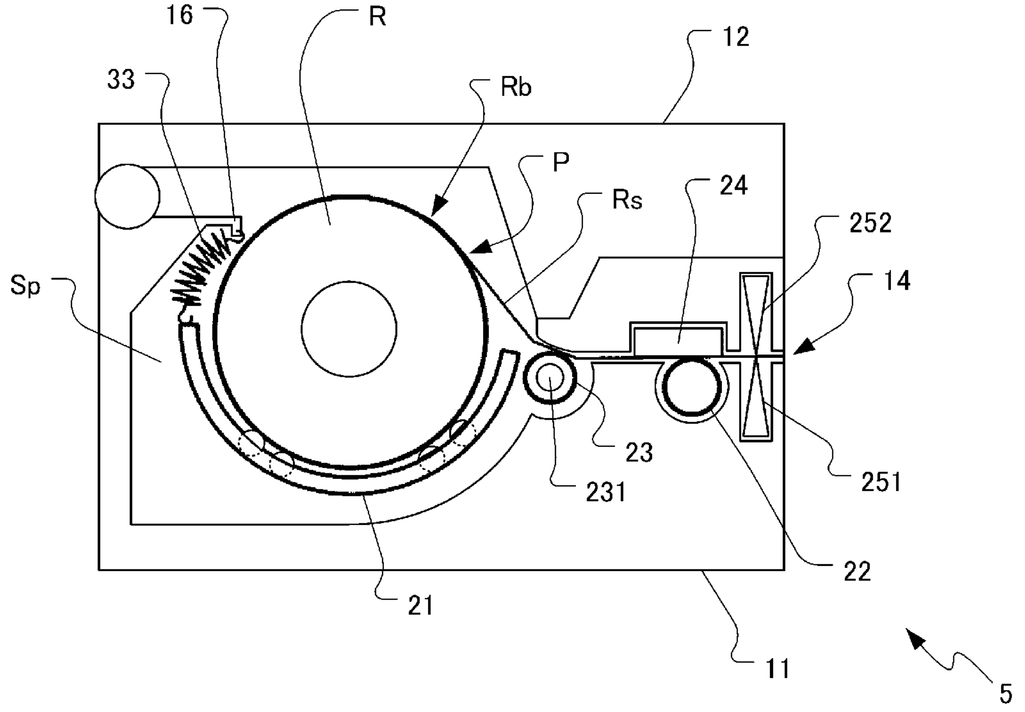
FIG. 5 is a diagram for explaining a configuration of a printer according to a third embodiment.

FIG. 5 is a diagram for explaining a configuration and an operation of a printer according to a third embodiment. In FIG. 5, as in FIGS. 3 and 4, an internal configuration of a printer 5 viewed from a side is illustrated, the printer 5 being in a state in which the cover 12 is closed.

The printer 5 according to this embodiment is different from the printer 4 according to the second embodiment in that the printer 5 includes swinging members 33 instead of the swinging members 31.

The swinging members 33 are formed as tensile springs locked by a locking section 16, one end of which is coupled to the conveying direction upstream side end portion of the swinging hopper 21 and the other end of which projects to the conveying direction downstream side from a conveying direction upstream side wall surface of the storage space Sp. The swinging members 33 support the upstream side end portion of the swinging hopper 21, whereby the swinging members 33 are extended to a certain degree in a state in which the roll paper R is placed on the swinging hopper 21. With a restoration force against the extension, the swinging members 33 are capable of urging the swinging hopper 21 upward and swinging the swinging hopper 21. It is preferable to, considering compactness of the printer 5, form the swinging members 33 to be curved in an arcuate shape to be fit in an extra space in the storage space Sp.

Effects and application examples of the swinging members 33 according to this embodiment are substantially the same as the effects and the application examples of the swinging members 32 according to the second embodiment. An operation of the printer 5 according to this embodiment is substantially the same as the operation of the printer 4 according to the second embodiment. Therefore, detailed explanation concerning the effects and the application examples and the operation of the printer 5 is omitted.

Fourth Embodiment

Figure 6:
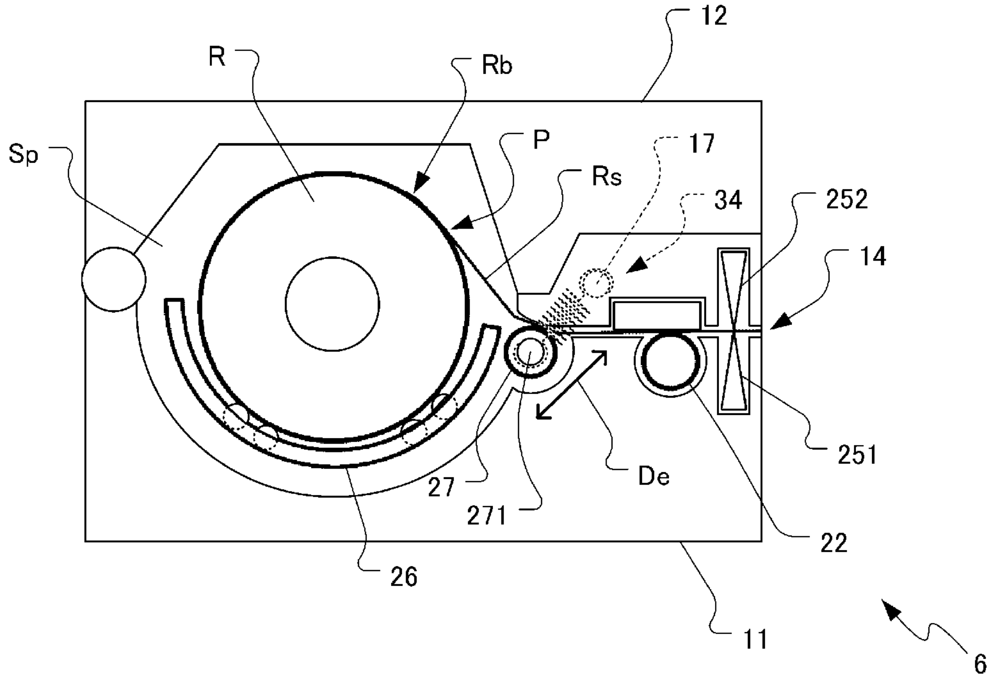
FIG. 6 is a diagram for explaining a configuration of a printer according to a fourth embodiment.

FIG. 6 is a diagram for explaining a configuration of a printer according to a fourth embodiment. In FIG. 6, as in FIGS. 3 to 5, an internal configuration of a printer 6 viewed from a side is illustrated, the printer 6 being in a state in which the cover 12 is closed.

The printer 6 according to this embodiment is different from the printer 1 according to the first embodiment in that the printer 6 includes a peeling roller 27 instead of the peeling roller 23, includes swinging members 34 instead of the swinging members 31, and includes a hopper 26 instead of the swinging hopper 21.

Unlike the swinging hopper 21 according to the first embodiment, the swinging members 34 are not coupled to the hopper 26. Therefore, the hopper 26 does not swing and is fixed in the storage space Sp.

The peeling roller 27 is a free roller capable of rotating around a rotating shaft 271 extending in the left-right direction (rotates counterclockwise in FIG. 6). The rotating shaft 271 is supported in the housing 11 to be movable in an extending and contracting direction De of the swinging members 34. Therefore, the peeling roller 27 is movable at least in the extending and contracting direction De of the swinging members 34 together with the rotating shaft 271. As a method of making the rotating shaft 271 movable, for example, two grooves into which both ends of the rotating shaft 271 are slidably inserted only have to be provided in the extending and contracting direction De of the swinging members 34 on a sidewall in a space in which the peeling roller 27 is housed. Both the ends of the rotating shaft 271 are respectively inserted into the grooves, whereby the rotating shaft 271 becomes movable along the grooves.

The swinging members 34 are formed as coil springs locked by a locking section 17, one end of which is attached to the rotating shaft 271 of the peeling roller 27 and the other end of which is provided in the housing 11. The swinging members 34 are paired by respectively being attached to axial direction both end portions of the rotating shaft 271. The swinging members 34 support both the end portions of the rotating shaft 271 to thereby make the peeling roller 27 and the rotating shaft 271 swingable. The swinging members 34 are towed downward by the weight of the peeling roller 27 and the rotating shaft 271.

Since the peeling roller 27 is coupled to the swinging members 34 in this way, if the sheet portion Rs is drawn out from the roll paper R, it is possible to swing the peeling roller 27 at least in the extending and contracting direction De of the swinging members 34. That is, if the sheet portion Rs is drawn out from the roll paper R by the platen roller 22, according to peeling and conveyance of the sheet portion Rs, force is applied to the peeling roller 27 that is in contact with an adhesive surface of the sheet portion Rs. At this time, since the peeling roller 27 is allowed to move at least in the extending and contracting direction De by the swinging members 34, the peeling roller 27 can swing according to an elastic force of the swinging members 34.

By swinging of the pealing roller 27, the peeling roller 27 can apply vibration, in particular, vibration in the extending and contracting direction De to the contact point P as in the first embodiment. If the sheet portion Rs is conveyed, even if slack and stiffness of the sheet portion Rs occur, the peeling roller 27 can relax the slack and the stiffness by swinging. Therefore, a damper function can be imparted to the printer 6 by the peeling roller 27 and the swinging members 34.

The swinging members 34 are preferably provided to be inclined with respect to the conveying direction as illustrated in FIG. 6 and more preferably inclined in parallel to the tangential direction T. By providing the swinging members 34 in this way, it is possible to adjust the extending and contracting direction De to the tangential direction T. The swinging members 34 are explained as swinging the peeling roller 27 in the extending and contracting direction De of the swinging members 34 but are not limited to this. The effects explained above can be achieved if the peeling roller 27 is movable, that is, swingable in a surface perpendicular direction of the printing surface in the sheet portion Rs that is in close contact with the contact point P.

All of the swinging members 31 to 34 according to the first to fourth embodiments explained above may be adopted in one printer or any two or three of the swinging members 31 to 34 may be adopted.

In the first to fourth embodiments, the swinging members 31 to 34 are respectively explained as being coil springs but are not limited to this. The swinging members 31 to 34 only have to be elastic bodies capable of swinging the swinging hopper 21 and the peeling roller 27. Examples of such elastic bodies include a leaf spring and a resin member such as rubber.

The swinging hopper 21 according to the embodiments is equivalent to, for example, the storing unit. The platen roller 22, the peeling roller 23, and the peeling roller 27 according to the embodiments are equivalent to, for example, the conveying unit. The swinging members 31 to 34 according to the embodiments are equivalent to, for example, the vibrating unit.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A printer, comprising:

a storage component configured to store liner-less roll paper wound in a roll shape of continuous paper including an adhesive surface on a rear surface of a printing surface;

a conveyance component configured to draw out one end of the continuous paper in the roll paper from the liner-less roll paper in an unwinding manner and convey a sheet portion that is the drawn-out continuous paper in a sheet form; and a vibration component configured to apply vibration to a contact point of the sheet portion and an external circumferential surface of the liner-less roll paper, the external circumferential surface adhering to the adhesive surface of the sheet portion at the contact point, wherein the storage component includes a hopper on which the liner-less roll paper is placed, the vibration component swings the hopper to thereby apply vibration to the contact point, and the vibration component includes an elastic body, one end of which is attached to the hopper, the elastic body vibrating the hopper according to peeling of the sheet portion from the liner-less roll paper that occurs if the sheet portion is drawn out from the liner-less roll paper by the conveyance component.

2. The printer according to claim 1, wherein the vibration component applies, to the contact point, vibration in a radial direction passing a center of the liner-less roll paper and the contact point.

3. The printer according to claim 1, wherein the elastic body is at least one of a torsion spring, a tensile spring, and a compression spring.

4. The printer according to claim 1, wherein the conveyance component includes a peeling roller that peels the sheet portion from the liner-less roll paper, and the elastic body is the torsion spring wound on a fulcrum of the peeling roller and urges the hopper to swing around the fulcrum.

5. The printer according to claim 1, wherein the hopper includes a plurality of rotatable supporting rollers that are in contact with an outer circumferential surface of the liner-less roll paper and support the liner-less roll paper so as to be configured to relatively rotate.

6. The printer according to claim 1, wherein the conveyance component includes a peeling roller that peels the sheet portion from the liner-less roll paper, and the vibration component vibrates the peeling roller to thereby apply vibration to the contact point.

7. The printer according to claim 6, wherein the vibration component includes an elastic body that swingably supports the peeling roller in order to apply, according to peeling of the sheet portion from the liner-less roll paper that occurs if the sheet portion is drawn out from the liner-less roll paper by the conveyance component, to the contact point, vibration in a radial direction passing a center of the liner-less roll paper and the contact point.

8. A method of drawing out paper from roll paper, comprising:

drawing out, from liner-less roll paper wound in a roll shape of continuous paper including an adhesive surface on a rear surface of a printing surface, the continuous paper at one end of the continuous paper in an unwinding manner and conveying a sheet portion that is the drawn-out continuous paper; and in the draw-out of the sheet portion, applying vibration to a contact point of the sheet portion and an external circumferential surface of the liner-less roll paper, the external circumferential surface adhering to the adhesive surface of the sheet portion;

swinging a hopper on which the liner-less roll paper is placed to thereby apply vibration to the contact point; and wherein the vibration component includes an elastic body, one end of which is attached to the hopper, vibrating the hopper with the elastic body according to peeling of the sheet portion from the liner-less roll paper that occurs if the sheet portion is drawn out from the liner-less roll paper.

9. The method according to claim 8, further comprising:

applying to the contact point vibration in a radial direction passing a center of the liner-less roll paper and the contact point.

10. The method according to claim 8, further comprising:

peeling the sheet portion from the liner-less roll paper with a peeling roller; and vibrating the peeling roller to thereby apply vibration to the contact point.

11. A point of sale printer, comprising:

a thermal print head;

a storage component configured to store liner-less roll paper wound in a roll shape of continuous paper including an adhesive surface on a rear surface of a printing surface;

a conveyance component configured to draw out one end of the continuous paper in the roll paper from the liner-less roll paper in an unwinding manner and convey a sheet portion that is the drawn-out continuous paper in a sheet form; and a vibration component configured to apply vibration to a contact point of the sheet portion and an external circumferential surface of the liner-less roll paper, the external circumferential surface adhering to the adhesive surface of the sheet portion at the contact point, wherein the storage component includes a hopper on which the liner-less roll paper is placed, the vibration component swings the hopper to thereby apply vibration to the contact point, and the vibration component includes an elastic body, one end of which is attached to the hopper, the elastic body vibrating the hopper according to peeling of the sheet portion from the liner-less roll paper that occurs if the sheet portion is drawn out from the liner-less roll paper by the conveyance component.

12. The point of sale printer according to claim 11, wherein the vibration component applies, to the contact point, vibration in a radial direction passing a center of the liner-less roll paper and the contact point.

13. The point of sale printer according to claim 11, wherein the elastic body is at least one of a torsion spring, a tensile spring, and a compression spring.

14. The point of sale printer according to claim 11, wherein the conveyance component includes a peeling roller that peels the sheet portion from the liner-less roll paper, and the elastic body is the torsion spring wound on a fulcrum of the peeling roller and urges the hopper to swing around the fulcrum.

* * * * *